UNITED STATES PATENT OFFICE.

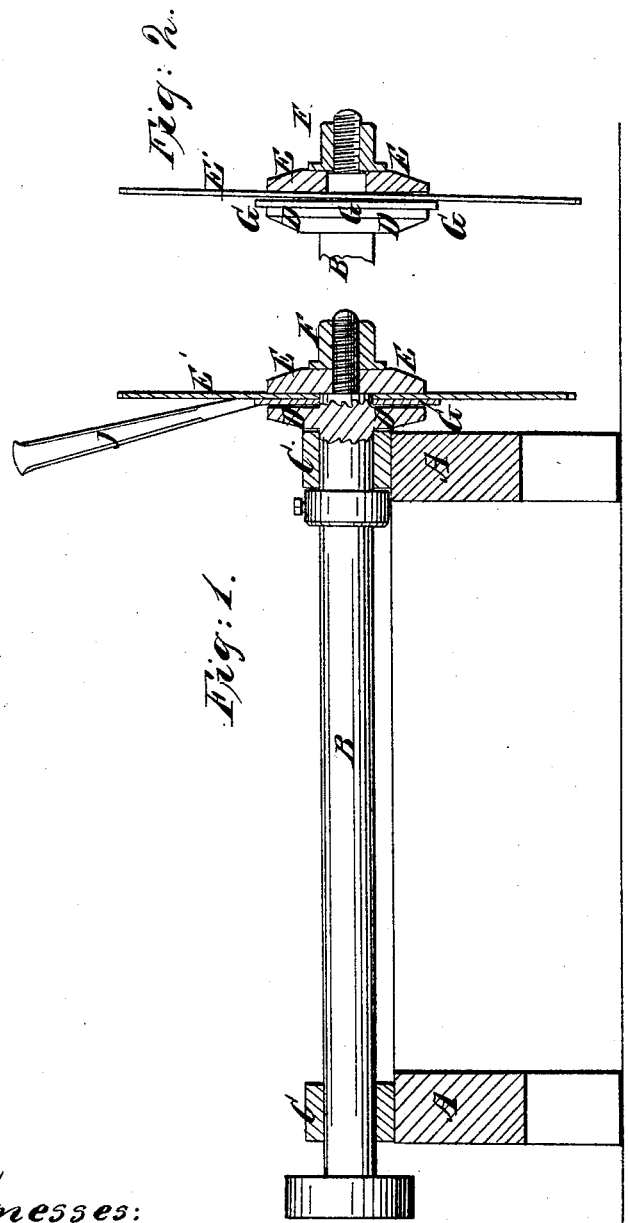

JOHN COLVILLE, OF WILMINGTON, NORTH CAROLINA, ASSIGNOR TO HIMSELF AND T. L. COLVILLE, OF SAME PLACE.

METHOD OF ADJUSTING CIRCULAR SAWS.

Specification of Letters Patent No. 25,996, dated November 1, 1859.

*To all whom it may concern:*

Be it known that I, JOHN COLVILLE, of Wilmington, in the county of New Hanover and State of North Carolina, have invented a new and useful Improvement in Adjusting Circular Saws; and I do hereby declare that the following is a full, clear, and exact description of the same, reference being had to the accompanying drawings, forming a part of this specification, in which—

Figure 1, is a vertical section taken through the bearings of the saw shaft and also through the parts connecting the saw to the shaft showing the application of the chisel for setting the saw true. Fig. 2, is a view showing the saw out of true.

This invention relates to a novel mode of adjusting circular saws upon their arbors or shafts so that they may be "set up" and made to run perfectly true either before the operation of sawing commences or when the sew has worked out of a true line.

It is of great importance in the operation of circular saws that the saw should run true, for if it should vary very slightly from a true line it will vibrate from side to side producing an irregular cut and a flanking whipping noise, and the saw will soon become heated by the surface friction which will soon cause it to buckle and the rapidity of the sawing is diminished, and if the saw is used in this state long it will be rendered totally worthless. Many expedients are resorted to for remedying this difficulty in running circular saws, such as paper strips, and strips of tin interposed between the collars and the surface of the saw, in which cases the saw must be loosened by unscrewing the collars between which it is held, but paper soon looses its efficiency from a partial heating of the parts, which soon takes place, while with the tin strips, it is seldom that a saw is so far out of true as to require a thickness of tin on either side.

My invention has for its object the remedying of these difficulties; and it consists in interposing between the fixed collar of the saw shaft and the saw, a ring of copper or other suitable metal, and then locking the saw upon the shaft by a loose collar and nut in the usual manner of hanging saws of this description; the use of which ring will be hereinafter described.

A, A, represent the saw frame with the saw shaft B, set in its journal boxes C, C.

D, is a fixed collar and E, a loose collar, between which is hung the circular saw E′, and locked by the nut F.

G, is the ring of copper or other suitable malleable metal interposed between the fixed collar D, and the surface of the saw. This ring projects out from the periphery of the collar D, an eighth of an inch, or more as may be found desirable.

In setting the saw true, after it has been first hung upon the shaft and locked up, with the ring G, in its place. I use a punch or chisel J, with a square end, and having ascertained the exact obliquity or how far it is out of true with the shaft, I hammer the edge of the copper ring down gently which increases its width at this point and by turning the saw with the hand and continuing the tamping with the chisel upon the edge of the ring, the saw can be "set up" so as to run perfectly true; and after running the saw for some time, should it begin to vibrate, by repeating the operation, the saw may be reset and kept in a true running order without the trouble and loss of time usually experienced in removing the saw from the shaft and placing paper or other substance between it and the fixed collar as above shown.

What I claim as my invention and desire to secure by Letters Patent is—

The expansion ring or plate of copper G, or any other suitable metal capable of being expanded for setting or adjusting the saw properly upon the shaft at any given point or points when the same is interposed between the saw and fixed collar as set forth.

JOHN COLVILLE.

Witnesses:
R. W. GIBBS,
A. LAMONT.